United States Patent [19]
Ross et al.

[11] 3,752,012
[45] Aug. 14, 1973

[54] POWER TRANSMISSION MECHANISM HAVING A TORQUE SENSITIVE PRESSURE REGULATOR VALVE

[75] Inventors: William D. Ross, Plymouth; Hesham A. Roushdy, Taylor, both of Mich.

[73] Assignee: Ford Motor Company, Dearborn, Mich.

[22] Filed: Nov. 12, 1971

[21] Appl. No.: 198,149

[52] U.S. Cl. ................................ 74/731, 74/865
[51] Int. Cl. ...................... F16h 17/00, B60k 21/00
[58] Field of Search ........................... 74/865, 731

[56] References Cited
UNITED STATES PATENTS

| | | | |
|---|---|---|---|
| 3,537,553 | 11/1970 | Olsen | 74/731 X |
| 2,337,748 | 12/1948 | Gsching | 74/731 |
| 2,642,971 | 6/1953 | Hagenbook | 192/56 |
| 2,959,984 | 11/1960 | Wickman | 74/688 |
| 3,180,095 | 4/1965 | Schneider | 74/731 UX |
| 3,237,734 | 3/1966 | Jania | 192/.032 |
| 3,416,393 | 12/1968 | Hattori | 74/731 |
| 3,675,512 | 7/1972 | Hirozawa | 74/731 X |

Primary Examiner—Arthur T. McKeon
Attorney—Keith L. Zerschling and Donald J. Harrington

[57] ABSTRACT

A power transmission mechanism having a hydrokinetic torque converter and multiple ratio gearing wherein the turbine is connected to the torque input element of a forward drive clutch that establishes an input torque delivery path for the gearing, the connection between the turbine and the torque input side of the clutch including a torsion shaft and a sleeve shaft surrounding the torsion shaft, a pressure regulator valve connected to the torsion shaft including a valve spring that is calibrated to establish a regulated operating pressure level, and means for connecting mechanically one end of the sleeve shaft to the torsion shaft whereby the spring forces on the latter are varied in proportion to the degree of relative movement of the torsion shaft with respect to the sleeve shaft.

3 Claims, 5 Drawing Figures

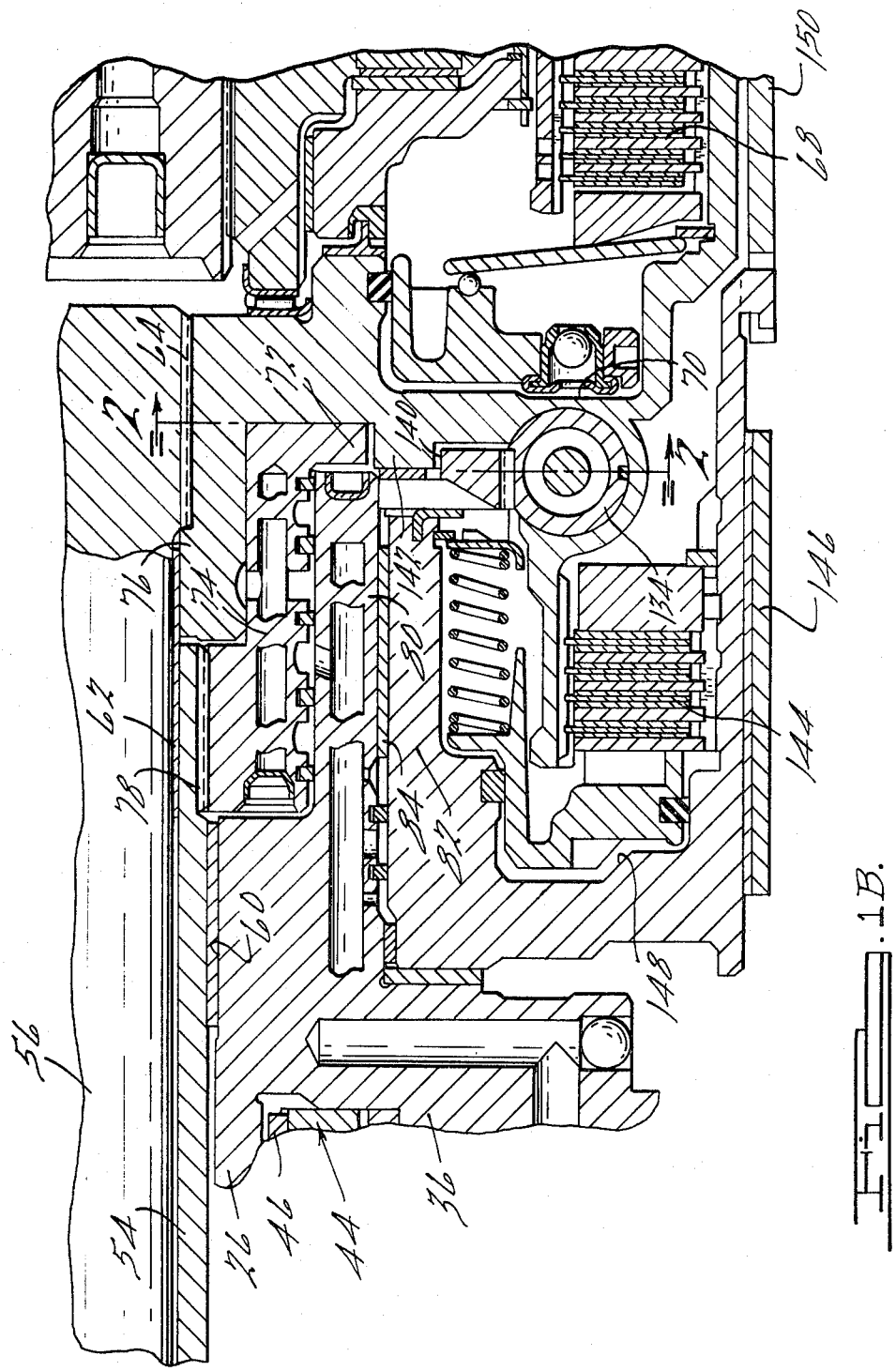

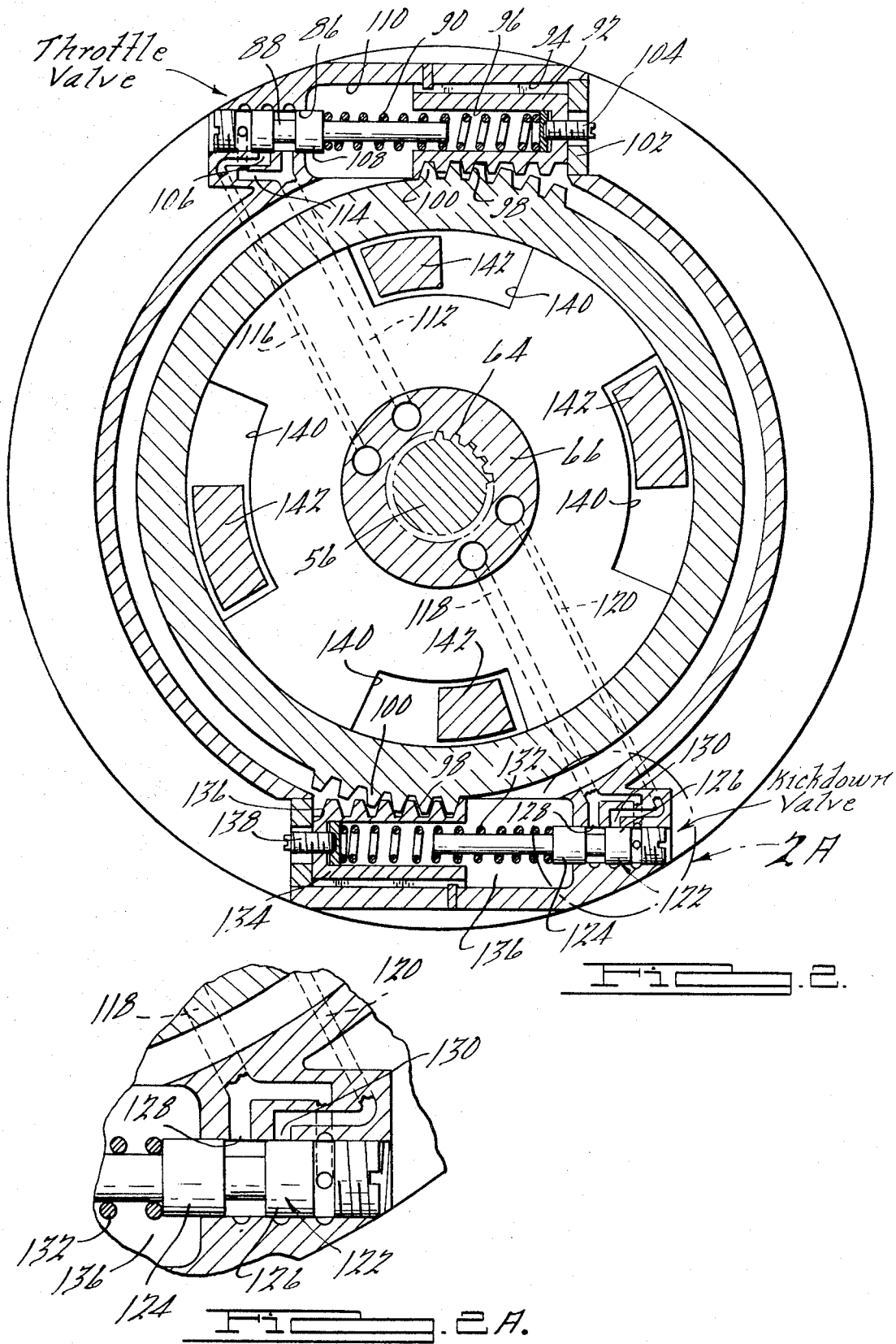

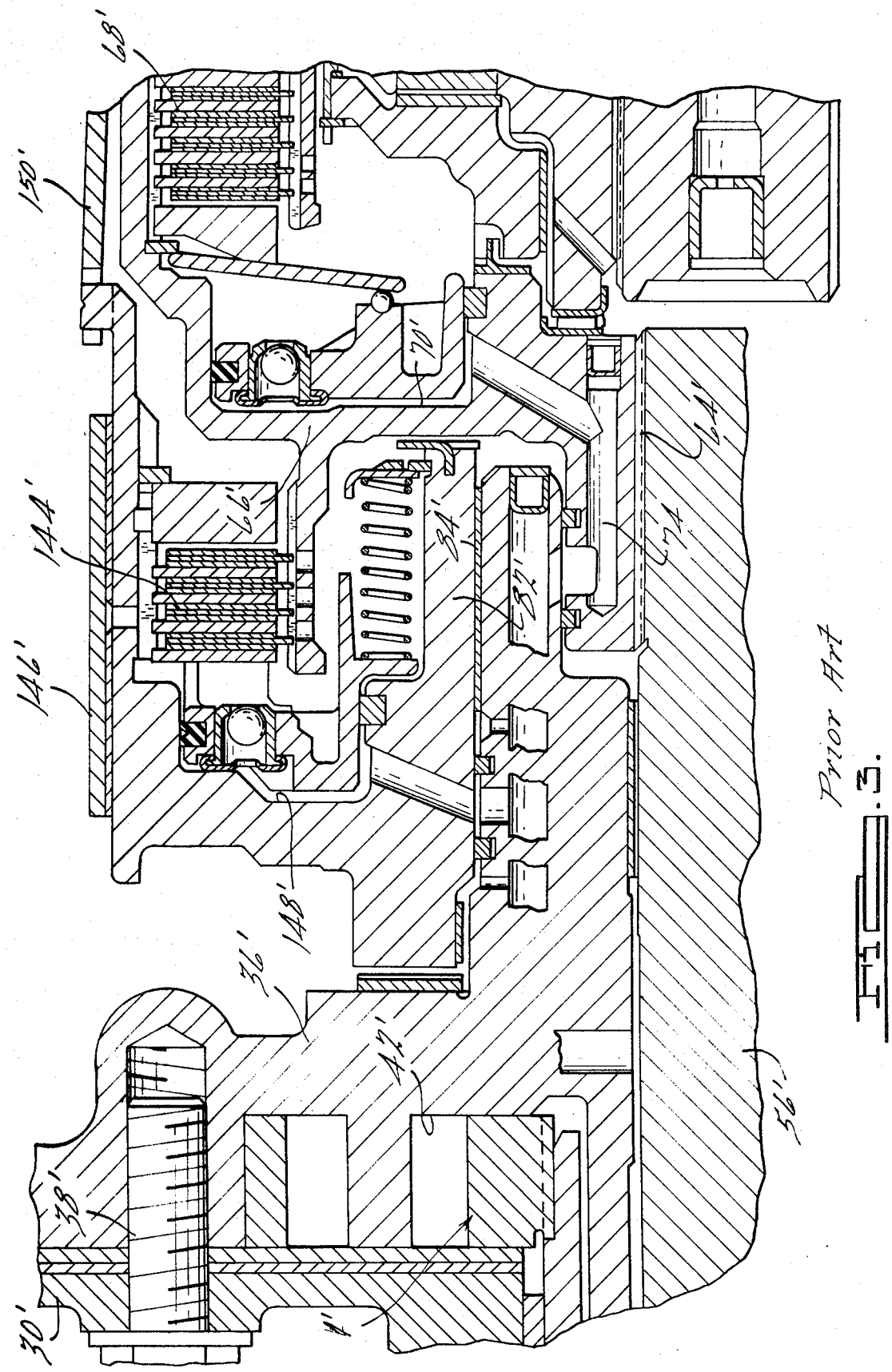

POWER TRANSMISSION MECHANISM HAVING A TORQUE SENSITIVE PRESSURE REGULATOR VALVE

GENERAL DESCRIPTION OF THE INVENTION

The improvements of our invention are adapted to be used in a multiple ratio torque converter transmission for an automotive vehicle. This transmission comprises a hydrokinetic torque converter and multiple ratio gearing, the impeller of the converter being connected to the vehicle engine and the turbine of the converter being connected through a forward-drive, selectively engageable clutch to the input elements of the gearing. The output elements of the gearing are connected to the vehicle traction wheels through a suitable driveshaft and differential-and-axle assembly. Relative motion of the elements of the gearing is controlled by clutches and brakes.

A positive displacement pump serves as a pressure source for fluid pressure operated servos used to actuate the clutches and brakes. An automatic control valve circuit controls pressure distribution to the servos to effect speed ratio changes. A driving torque signal and a driven speed signal usually are used as control parameters for actuating the clutches and brakes. The signals act upon torque and speed sensitive elements of the valve system.

It is conventional practice to use an engine intake manifold pressure operated modulator valve to develop the torque signal. The modulator valve, which is referred to usually as a throttle valve, is in communication with the pressure source. Its output side is connected to transmission ratio shift valves which respond to changes in the throttle valve signal and the speed signal to initiate ratio changes. The throttle pressure signal is distributed also to the pressure regulator valve for the pressure source so that the operating pressure level maintained in the valve circuit is related generally to the magnitude of the torque being delivered.

In certain driveline installations the use of engine intake manifold pressure is not a reliable indicator of engine torque. This is especially true if the driveline includes an internal combustion engine having engine exhaust emission controls that require recirculation of engine exhaust gases to the fuel intake manifold system. It is necessary, therefore, to obtain a torque signal in such installations without relying upon engine manifold pressure.

The improvements of our invention make it possible to obtain a reliable torque signal that relies only upon the torque delivered by the turbine. It is sensitive directly to turbine torque, which is distributed to the input elements of the gearing, rather than to operating variables that depend upon engine characteristics.

The turbine torque signal is achieved by using a turbine driven shaft that comprises two parts, one telescopically received within the other. The innermost shaft is a torsion shaft that deflects relative to the outermost shaft, which is the sleeve shaft driven by the turbine. The torsion shaft is connected directly to the torque input side of a forward drive clutch that is used to complete a torque delivery path to the input elements of the gearing. The sleeve shaft, which during operation within a predetermined torque range does not carry torque, is connected directly to a valve spring for a throttle pressure modulator valve carried by the input side of the forward clutch. If the torsion shaft should deflect relative to the sleeve shaft, the force of the spring for the throttle valve will be adjusted. The valve is arranged to provide increased spring force upon deflection of the torsion shaft relative to the sleeve shaft. After a predetermined torque level is achieved, a mechanical connection is established between the torsion shaft and the sleeve shaft so that turbine torque then is delivered through both shafts and further throttle pressure modulation does not take place upon further increases in torque.

BRIEF DESCRIPTION OF THE FIGURES OF THE DRAWING

FIGS. 1A and 1B show a portion of an automatic power transmission mechanism that include the improvements of our invention.

FIG. 2 is a cross-sectional view taken along the plane of section line 2—2 of FIG. 1B.

FIG. 2A is an enlargement of a portion of the valve shown in FIG. 2.

FIG. 3 is a cross-sectional view of a portion of the gearing of an automatic power transmission mechanism of known design. This is included to show the distinctions between the prior art and the improvement of our invention.

PARTICULAR DESCRIPTION OF THE INVENTION

Figure 1A:
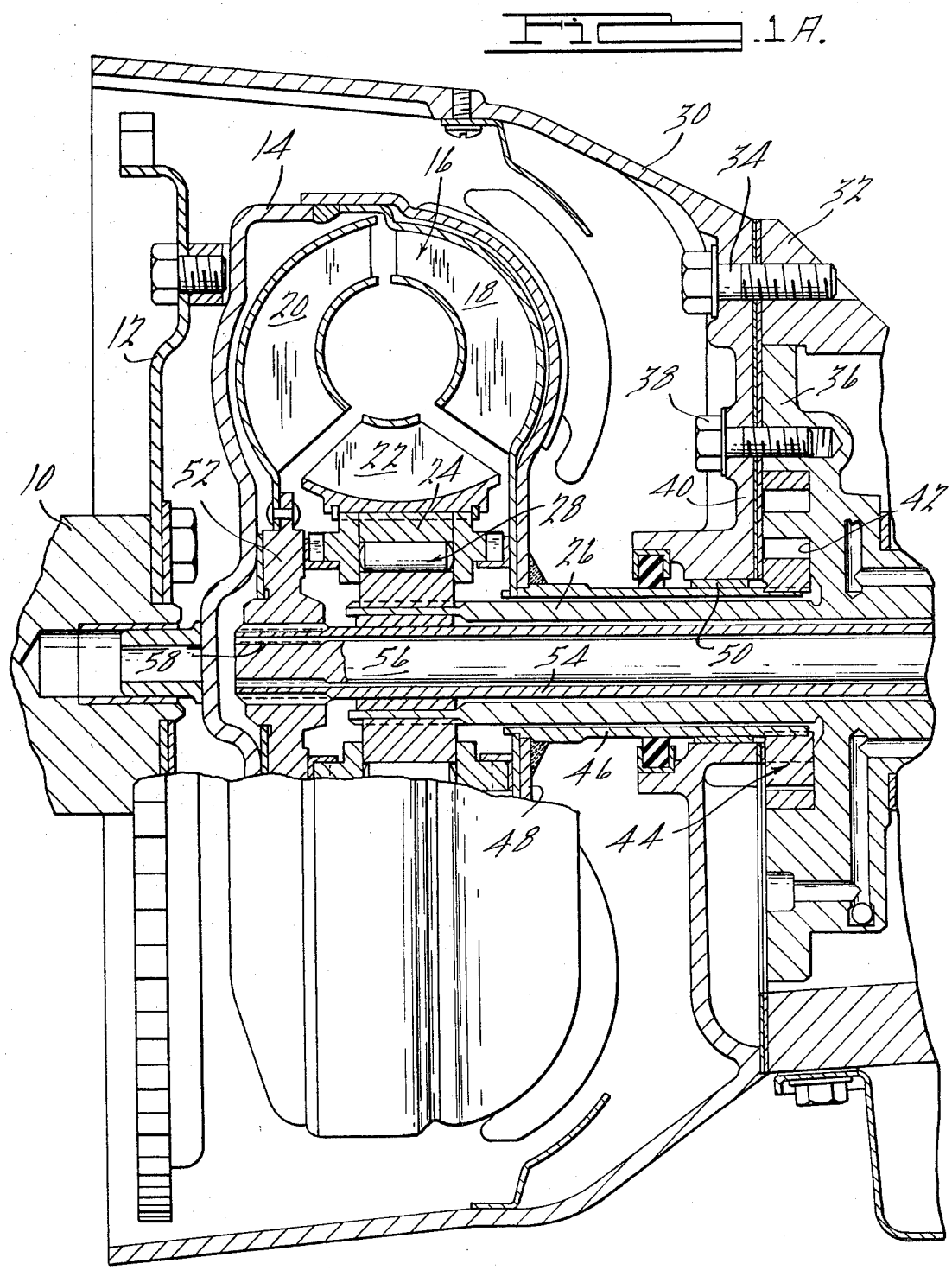

In FIG. 1, numeral 10 designates one end of the crankshaft of an internal combustion engine for an automotive vehicle. It is connected through a suitable driveplate 12 to the impeller shell 14 of a hydrokinetic torque converter 16. The converter 16 includes a bladed impeller 18, a bladed turbine 20 and a bladed stator 22. The impeller of the turbine and the stator are arranged in toroidal fluid flow relationship in the usual way.

Stator 22 comprises a hub 24 which is supported on a stationary stator sleeve shaft 26. An overrunning brake 28 prevents rotation of bladed stator 22 in a direction opposite to the direction of rotation of the impeller where it permits freewheeling motion in the direction of rotation of the impeller. Converter 16 is enclosed within a converter housing 30 which in turn is bolted at its left-hand margin to the engine block of an internal combustion engine.

A transmission housing 32 is bolted by means of bolts 34 to the converter housing 30. A clutch supporting wall 36 is bolted by bolts 38 to an end wall 40 of the housing 30. The support wall 36 defines a pump cavity 42 within which is positioned geared pump members of a positive displacement pump identified generally by reference character 44. The driving gear element of the pump 44 is connected drivably to sleeve shaft 46 which in turn is secured drivably to the hub 48 of the impeller 18. The input gear element of the pump 44 then is driven directly by the crankshaft 10 at engine speed. A bearing 50 in a bearing opening formed in the wall support 40 journals the sleeve shaft 46.

The turbine hub 52 is splined to turbine sleeve shaft 54. Situated within sleeve shaft 54 is torsion shaft 56. This is splined at 58 to the sleeve shaft 54 thereby establishing a direct driving connection between the turbine hub and each of the shafts 54 and 56. Shaft 54 is journalled within opening 60 formed in the support wall 36. Stator sleeve shaft 26 forms an extension of the wall 36. The free end of shaft 56 is journalled by means of bearing 62 within the sleeve 54. Shaft 56 is splined at 64 to clutch member 66 for a forward drive clutch 68. Clutch 68 is adapted to establish selectively a driving connection between the turbine and torque input elements of the gearing. Clutch member 66 defines an annular cylinder 70 within which is positioned an annular piston which actuates and releases the clutch plates of the clutch 68.

A valve disc 72 is formed on sleeve 74 which in turn is supported by a sleeve hub 76 of the member 66. Relative motion may take place between hub 74 and sleeve 76. Hub 74 is splined at 78 to the free end of the sleeve shaft 54. Disc 72 then is caused to rotate with the turbine hub.

Clutch support sleeve 80 is formed integrally with the wall 36 and hub 74 is received within it. At intermediate speed ratios, clutch drum 82 is journalled by means of bushing 84 on the sleeve 80.

Clutch member 70 is provided with a valve chamber 86 having its axis extending transversely with respect to the axis of the clutch. Valve element 88 is slidably disposed in the opening 86. Valve spring 90 acts directly on the valve element 88 and it is seated within an adjustable spring retainer 92. Retainer 92 is adjustably positioned within an opening 94 situated in a direction generally parallel to the axis of the valve chamber 86. Spring retainer 92 is formed in the central opening 96 which receives the spring 90. Rack teeth 98 are formed on the exterior of the retainer 92. These teeth engage teeth 100 formed on the outer margin of valve disc 72.

Retainer 92 is anchored on shoulder 102 of the clutch member 70. If desired a threaded adjusting member 104 may be threadably received in the base of the retainer 92. This engages a washer upon which the spring 90 is seated. Adjustment of the member 104 relative to the retainer 92 thus controls the initial compression of spring 90.

Valve element 88 includes spaced valve lands 106 and 108. The chamber 110 occupied by spring 90 is open to exhaust. Line pressure passage 116 extends from the discharge side of the pump 44 to a valve port in the chamber 86 controlled by land 106. A pressure feedback passage 114 communicates with the left-hand side of land 106. An outlet pressure passage 112 receives modulator pressure developed by the valve element 88. Its magnitude is dependent upon the compression of spring 90. Upon an increase in the force of spring 90, the degree of communication between passages 112 and 116 is increased and the degree of communication between passage 112 and exhaust chamber 110 is decreased. The converse is true when the compression of spring 90 is decreased. The magnitude of the pressure in passage 112 then is an indicator of the compression of spring 90 which in turn is determined by the position of the retainer 92 relative to the clutch member 66. The position of retainer 92 in turn is determined by the relative displacement of the shaft 56 relative to the sleeve shaft 54.

The sleeve 74 is provided with four axially extending passages which communicate with corresponding passages formed in the sleeve 80. These are schematically illustrated in FIG. 2 by reference characters 116 and 112, 118 and 120. Passage 118 and 120 communicate with a kickdown valve identified generally by reference character 122. This valve includes a valve spool having spaced valve lands 124 and 126 which are slidably received in valve chamber 128. Passage 118, which is the output pressure passage for valve 122, communicates with the valve chamber 128 at a location intermediate the lands 124 and 126. Passage 118 communicates also with the right-hand side of the valve 122. Line pressure supply passage 120 communicates with a port 130 located directly adjacent land 126. This port is uncovered by the land 126 when the valve 122 is moved in a right-hand direction. Movement of the valve in a right-hand direction is opposed by the line pressure which exists in passage 118.

Valve spring 132 acts upon the valve 122. The spring is seated in a spring retainer 134 which is slidably positioned in chamber 136. Retainer 134 is anchored against the shoulder 136 formed on or carried by the clutch member 66. A threaded adjusting member 138 threadably received within an opening in the end of retainer 134 may be used to control the initial compression of spring 132.

The disc 72 is provided with apertures 140 within which are received torque limiting blocks 142 carried by the member 66. A substantial degree of arcuate motion of the blocks 142 within the openings 140 is permitted because of the greater arcuate dimension of the openings 140.

During normal operation turbine torque is delivered through the shaft 56 to the clutch member 66. The turbine torque results in torsional deflection of the shaft 56 thereby causing compression of the spring 90 which causes in turn a change in the forces acting on the throttle valve element 88. The greater the torsional deflection of the shaft 56 relative to the sleeve shaft 54, the greater the valve actuating force acting on element 88. An increased deflection will result in increased pressure in passage 120. Thus the pressure in passage 120 is proportional to deflection of the shaft 56, which in turn is linearly related to turbine torque.

When the engine throttle is advanced toward a wide open throttle setting, the spring 132 of the kickdown valve will be compressed sufficiently to cause valve 122 to uncover line pressure passage 120 thereby establishing communication between passage 118 and 120. This, in turn, causes a kickdown pressure signal to be developed in passage 118, which may be distributed to the control system to force a downshift in response to movement of the engine throttle toward a wide open setting. This downshift complements the downshifting tendencies created by the throttle pressure.

After a limiting torque is developed, torque limiting blocks 142 engage the ends of the slots 140 so that torque then is delivered through each of the shafts 56 and 54 to the input side of the forward drive clutch 68.

In FIG. 3 we have illustrated, for purposes of comparison, a clutch and brake arrangement of conventional design. The corresponding elements of FIG. 3 that have counterpart elements in the construction of FIGS. 1B and 2 have been indicated by similar reference characters although prime notations have been added. It should be noted in comparing FIG. 2 and FIG. 3 that FIG. 3 includes a clutch member 66' which does not carry a valve assembly such as the assemblies shown in part at 122 and 88.

The torque signal in the conventional arrangement of FIG. 3 is obtained by a throttle valve arrangement that is dependent upon engine throttle displacement or engine intake manifold pressure. The throttle valve and the kickdown valve thus are not integrally related in the structural combination shown in FIG. 3, as they are in the construction of our invention. For a further description of a clutch and brake arrangement and control system of the type shown in FIG. 3, reference is made to U.S. Pat. No. 3,446,098 or U.S. Pat. No. 3,310,991, both of which are owned by the assignee of this invention.

In the embodiment of FIG. 1B a high speed ratio clutch 144 is adapted to connect the member 66 to clutch member 82 which, as explained previously, is journalled for rotation on the sleeve 80. An intermediate speed ratio brake band 146 encircles the member 82 and provides an anchor point during intermediate speed ratio operation. When clutch 144 is disengaged member 82 defines a fluid pressure cavity 148 which receives a clutch piston that engages and disengages clutch 144 when fluid pressure is admitted to and exhausted from the chamber defined in part by the cylinder 148. Member 82 is connected drivably to a torque delivery drive-shell 150 which surrounds the clutch 68 and which extends to one of the torque input elements of the gearing.

Having described a preferred embodiment of our invention, what we claim and desire to secure by U.S. Letters Patent is:

1. In a power transmission mechanism having a torque converter and multiple ratio gearing, said converter including an impeller connected to an engine and a turbine, a selectively engageable clutch having an output element connected to a torque input element of said gearing, a torsion shaft connected at one end thereof to said turbine and at the other end thereof to a torque input element of said clutch, a sleeve shaft surrounding said torsion shaft and connected at one end thereof to said turbine, a modulator valve element carried by said torque input clutch element at a location spaced radially from the axis of said torsion shaft and said sleeve shaft including a movable modulator valve element movable linearly, spring means acting on said modulator valve element for applying to the latter a force that is opposed by hydrostatic pressure forces acting thereon, a movable spring reaction member carried by said torque input clutch element, a driving connection between the other end of said sleeve shaft and said spring reaction member including a rotary drive member in positive driving engagement with said spring reaction member whereby torsional deflection of said torsion shaft relative to said sleeve shaft is effective to change the force of said spring on said spring reaction member which is displaced linearly through a distance proportional to said torsional deflection, a fluid pressure source, and internal passage means in portions of said clutch for distributing pressure from said fluid pressure source to said modulator valve element and for distributing modulated output pressure from said modulator valve element to pressure sensitive portions of said mechanism.

2. In a power transmission mechanism having a torque converter and multiple ratio gearing, said converter including an impeller connected to an engine and a turbine, a selectively engageable clutch having an output element connected to a torque input element of said gearing, a torsion shaft connected at one end thereof to said turbine and at the other end thereof to a torque input element of said clutch, a sleeve shaft surrounding said torsion shaft and connected at one end thereof to said turbine, a modulator valve element carried by said torque input clutch element at a location spaced radially from the axis of said torsion shaft and said sleeve shaft including a movable modulator valve element movable linearly, spring means acting on said modulator valve element for applying to the latter a force that is opposed by hydrostatic pressure forces acting thereon, a movable spring reaction member carried by said torque input clutch element, a driving connection between the other end of said sleeve shaft and said spring reaction member including a rotary drive member in positive driving engagement with said spring reaction member whereby torsional deflection of said torsion shaft relative to said sleeve shaft is effective to change the force of said spring on said spring reaction member which is displaced linearly through a distance proportional to said torsional deflection, a fluid pressure source, internal passage means in portions of said clutch for distributing pressure from said fluid pressure source to said modulator valve element and for distributing modulated output pressure from said modulator valve element to pressure sensitive portions of said mechanism, a pressure area on said modulator valve element in communication with said output pressure passage whereby hydrostatic pressure forces on said modulator valve element are developed in opposition to the force of said spring, and mechanical means including engageable parts carried by said torsion shaft and said sleeve shaft for limiting the magnitude of the relative displacement between said torsion shaft and said sleeve shaft.

3. In a power transmission mechanism having a torque converter and multiple ratio gearing, said converter including an impeller connected to an engine and a turbine, a selectively engageable clutch having an output element connected to a torque input element of said gearing, a torsion shaft connected at one end thereof to said turbine and at the other end thereof to the torque input side of said clutch, a sleeve shaft connected at one end thereof to said turbine, a modulator valve element carried by said torque input clutch member including a movable modulator valve element, spring means acting on said modulator valve element for applying to the latter a force that is opposed by hydrostatic pressure forces acting thereon, a movable spring reaction member carried by said torque input clutch member, a driving connection between the other end of said sleeve shaft and said spring reaction member whereby torsional deflection of said torsion shaft relative to said sleeve shaft is effective to change the compression forces of said spring, a fluid pressure source, internal passage means in portions of said clutch for distributing pressure from said fluid pressure source to said modulator valve element and for distributing modulated output pressure from said modulator valve element to pressure sensitive portions of said mechanism, a kickdown valve means carried by said torque input clutch member, a kickdown pressure passage and a pressure supply passage communicating with said kickdown valve means, a line pressure supply passage communicating with said pressure source, spring means acting on said kickdown valve means for applying thereto a valve operating force, a spring reaction member providing a support for said kickdown valve spring, and a mechanical connection between said sleeve shaft and said last named spring reaction member whereby said kickdown valve establishes communication between said line pressure supply passage and the kickdown pressure passage when the displacement of said torsion shaft relative to said sleeve shaft approaches its maximum value.

* * * * *